(12) United States Patent
Poynter

(10) Patent No.: US 7,120,570 B2
(45) Date of Patent: Oct. 10, 2006

(54) METHODS AND APPARATUS FOR DESIGN OF DOT MATRIX VISUAL DISPLAYS

(75) Inventor: William Douglas Poynter, Duluth, GA (US)

(73) Assignee: NCR Corporation, Dayton, OH (US)

( * ) Notice: Subject to any disclaimer, the term of this patent is extended or adjusted under 35 U.S.C. 154(b) by 1177 days.

(21) Appl. No.: 09/847,755

(22) Filed: May 2, 2001

(65) Prior Publication Data

US 2002/0165705 A1  Nov. 7, 2002

(51) Int. Cl.
  G09G 1/14    (2006.01)
  G09G 3/20    (2006.01)
  G09F 15/00   (2006.01)
  G09F 9/455   (2006.01)
  G09G 5/02    (2006.01)

(52) U.S. Cl. .......................... 703/23; 345/26; 345/55; 345/636; 345/689; 345/613; 715/531

(58) Field of Classification Search ................. 703/23; 345/689, 467, 26, 55, 636, 613, 616; 715/531
See application file for complete search history.

(56) References Cited

U.S. PATENT DOCUMENTS 5,221,920 A * 6/1993 Poynter ...................... 345/591
5,513,304 A * 4/1996 Spitz et al. .................. 715/500
5,852,448 A * 12/1998 Cheng ......................... 345/469
5,995,086 A * 11/1999 Dowling et al. ............. 345/467
6,529,197 B1 * 3/2003 Ballard et al. ............... 345/468

OTHER PUBLICATIONS

NEC Corporation, "Character Pattern Editor for On-Screen Display of LSI for Windows", User's Manual, Nov. 2000.*

* cited by examiner

*Primary Examiner*—Paul Rodriguez
*Assistant Examiner*—Tom Stevens
(74) *Attorney, Agent, or Firm*—Priest & Goldstein, PLLC

(57) ABSTRACT

A design tool for choosing and modifying features of a dot matrix display. The design tool allows a user to design and save a character set and then to enter and view text to be displayed using the character set. The user is able to modify features of the display and to immediately see the result of any modifications made. The user may further see a representation of a hardware display having features and characteristics selected by the user, and may modify the features as desired. As the modifications are made, they are reflected in the representation of the hardware display. The design tool allows the user to store numerical representations of the selected features and characteristics of the design in order to provide the numerical representations to personnel implementing a hardware embodiment of the design.

12 Claims, 6 Drawing Sheets

/— 300

DecisioNet Display Development Tool

Release 9.90

Developed by

NCR Human Factors Engineering

Application Developers: Douglas Paynton, Phd.

| Front Designer (302) | Display Designer (304) |
|---|---|
| Display Viewers (306) | Exit (308) |

METHODS AND APPARATUS FOR DESIGN OF DOT MATRIX VISUAL DISPLAYS

FIELD OF THE INVENTION

The present invention relates generally to improved techniques for design of electronic displays. More particularly, the invention relates to methods and apparatus for quick and easy generation, viewing and modification of dot matrix designs for use in electronic display devices.

BACKGROUND OF THE INVENTION

Dot matrix displays are used in a number of applications and offer considerable advantages because they can be implemented using relatively inexpensive components and can also offer relatively low power consumption. Dot matrix displays are commonly used in retail establishments checkout systems for both retail employee operated and customer operated input and output devices.

The needs of retailers and others who use devices employing dot matrix displays are constantly changing, and different users often have different needs. The visual appearance of a dot matrix display may be an important aspect of a retailer's interface with a customer. Certain designs may be particularly appealing or eye catching, and different designs may be desirable in different applications. Moreover, a manufacturer of dot matrix display devices may wish to experiment with different designs in order to determine which designs are best for the needs of a particular customer, or to offer a variety of different designs. Prior art methods of producing dot matrix designs are complex and time consuming. A design must be manually created and then visually evaluated. This may be accomplished, for example, by making a drawing and then furnishing the drawing to decision making personnel for review. Changes to the design may be suggested and the drawing can be changed in accordance with these suggestions. At various points in the design process, working or non-working prototypes can be fabricated for evaluation. If changes to the prototype design are desired, new drawings and prototypes can be produced, with the design stages continuing until a satisfactory design is arrived at and put into production.

Drawings can be made using software drawing tools, but these drawings lack many of the features of an actual operating display, and can only approximate the appearance of the display. Moreover, making changes to drawings is time consuming. A prototype display can provide an exact representation of a design, but making changes to the design requires fabrication of a new prototype display, a time consuming and expensive process.

The need to manually implement sample designs, evaluate the designs, and then manually implement desired changes adds greatly to the time and expense required to create a desired design. The time and cost of design creation naturally limits the variety of designs which a manufacturer is likely to offer, and limits the ability of a manufacturer to create custom designs in an inexpensive and timely manner.

There exists, therefore, a need for a quick, inexpensive and flexible way to create and evaluate dot matrix designs, allowing for modification of design features as desired and allowing a designer or evaluator to view desired aspects of a design.

SUMMARY OF THE INVENTION

A dot matrix display design tool according to the present invention is preferably implemented in software on a computer. The display design tool includes a character set designer, allowing a user to construct a character set comprising a set of characters having any one of a number of matrix sizes. Matrix sizes are typically expressed as X by Y, where X is a number of pixel columns and Y is a number of pixel rows. The character set designer allows the user to specify the matrix size and create a design for each character in the character set, with the user being allowed to specify pixel values for each location in a matrix.

The design tool also includes a display designer for use once a character set has been created. The display designer allows the user to vary desired characteristics of the visual appearance of the display, such as matrix dimensions, pixel shape, inter-pixel separation and other characteristics. The display designer displays a value for each modifiable display characteristic. These values are therefore readily available for analysis in order to evaluate unit costs or to provide engineering specifications needed in manufacture of a display.

The design tool further includes a display viewer which allows a user to simulate an operating hardware display, and to specify and view additional characteristics of the display, such as display labeling, housing shape and color. The user is also able to specify characteristics such as message frequency, scrolling speed and frequency, interword spacing and punctuation spacing. The user is thus able to view a "virtual" hardware device, for example a "virtual" electronic price label, which exists simply as a display on a computer monitor but which allows the user to see how the device would appear when manufactured and to modify the operating characteristics of the device in order to achieve the desired characteristics.

A more complete understanding of the present invention, as well as further features and advantages of the invention, will be apparent from the following Detailed Description and the accompanying drawings.

DETAILED DESCRIPTION

Figure 1:
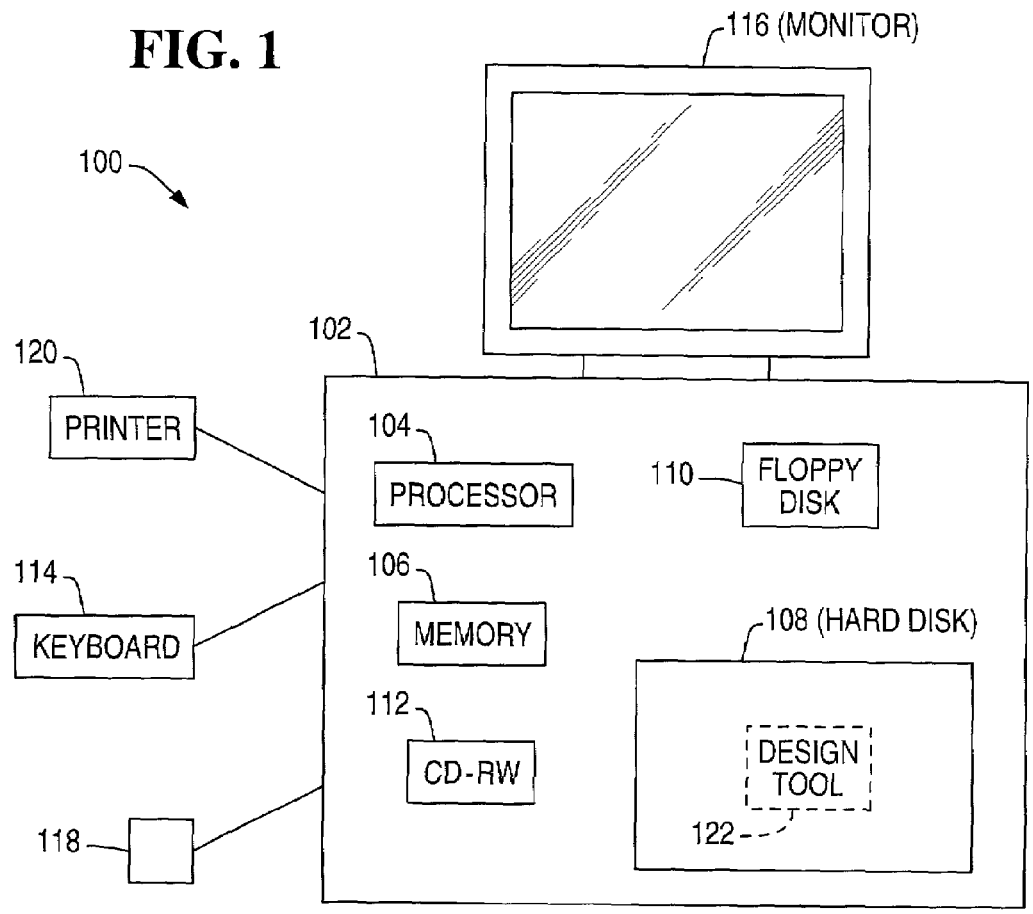
FIG. 1 illustrates a computer system used to implement a design tool according to the present invention.

FIG. 1 illustrates a computer system 100 used to implement a design tool according to the present invention. The computer system 100 may suitably be a personal computer PC or other similar low cost and versatile computer system. The computer system 100 may suitably include a processing unit 102, containing a processor 104, memory 106, a hard disk 108, a floppy disk drive 110, and a rewritable recordable compact disk (CD-RW) drive 112 adapted to read standard or recordable compact disks and to write data to recordable compact disks. The computer system 100 also includes a keyboard 114, a monitor 116, a pointing device such as a mouse 118 and a printer 120. The computer system 100 preferably stores design tool software 122 on the hard disk 108 and executes the software in response to a user selection, providing user information and displays using the monitor 110 and printer 118 and receiving user inputs using the keyboard 108, mouse 114 and other user input devices. Implementation of the design tool 122 on the computer system 100 allows an operator to specify elements and features of a visual display and to see a representation of a display having the specified elements and features. The operator is able to make selections and changes as desired, and immediately see those selections and changes reflected on the monitor 116.

Figure 2:
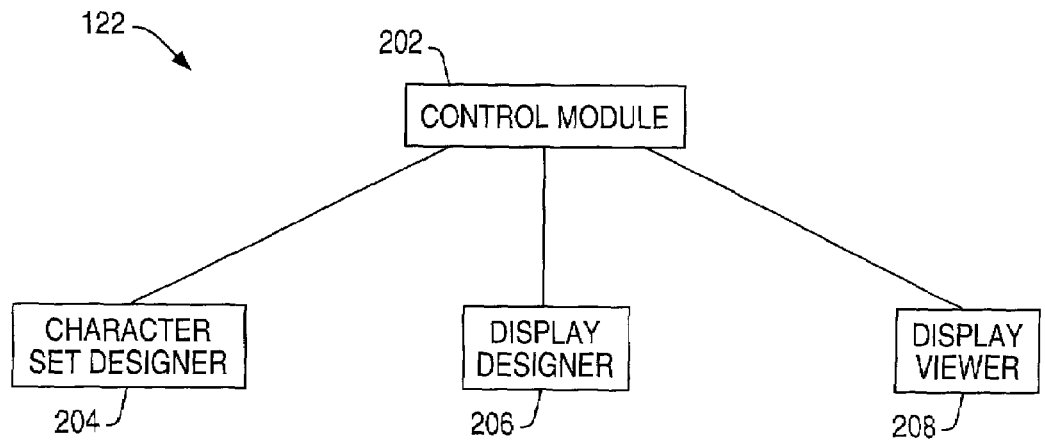
FIG. 2 is a functional illustration of a design tool according to the present invention.

FIG. 2 illustrates functional details of the design tool 122 according to the present invention. As noted above, the design tool 122 is preferably implemented in software using a computer system such as the computer system 100 of FIG. 1. It will be recognized, however, that the design tool 122 may also be implemented using dedicated hardware.

The design tool 122 includes a control module 202 allowing user selection of one of the various components of the design tool 122. By making an appropriate selection, the user directs the control module to invoke a character set designer module 204, a display designer module 206 or a display viewer 208, or to exit from the design tool 122.

When the user selects one of the modules 204–208, the control module 202 invokes and executes the selected module. Each of the modules 204–208 provides a user interface form allowing the user to make selections and choices and to see the results of the selections and choices made, as well as to save his or her work whenever desired. Details of user interface forms provided by each of the modules are illustrated in FIGS. 3–6 below. Each of the modules 204–208 allows the saving of numerical values describing display characteristics, so that the user can provide the characteristics to personnel producing a hardware implementation of a display.

After the user has selected one of the modules 204–208, he or she works with the selected module as long as desired and may then select another of the modules 204–208 or the control module 202. The control module 202 provides the user with an opportunity to exit the design tool 122 by making an appropriate selection.

Figure 3:
FIG. 3 illustrates a control module interface form according to the present invention.

FIG. 3 illustrates a control module interface form 300 according to the present invention, used to provide a user interface with the control module 202. The control module interface form 300 provides buttons 302–306, allowing selection of the character set designer module 204, the display design module 206 or the display viewer module 208, respectively. The form 300 also provides button 308, allowing the user to exit. In order to make a selection, a user may advantageously use a mouse or other pointing device to move a pointer over a desired button and then click or otherwise activate the pointing device to make a selection. Alternatively, the interface form 300 can be displayed on a touch screen display and the user can make selections by touching the desired button on the touch screen.

Figure 4:
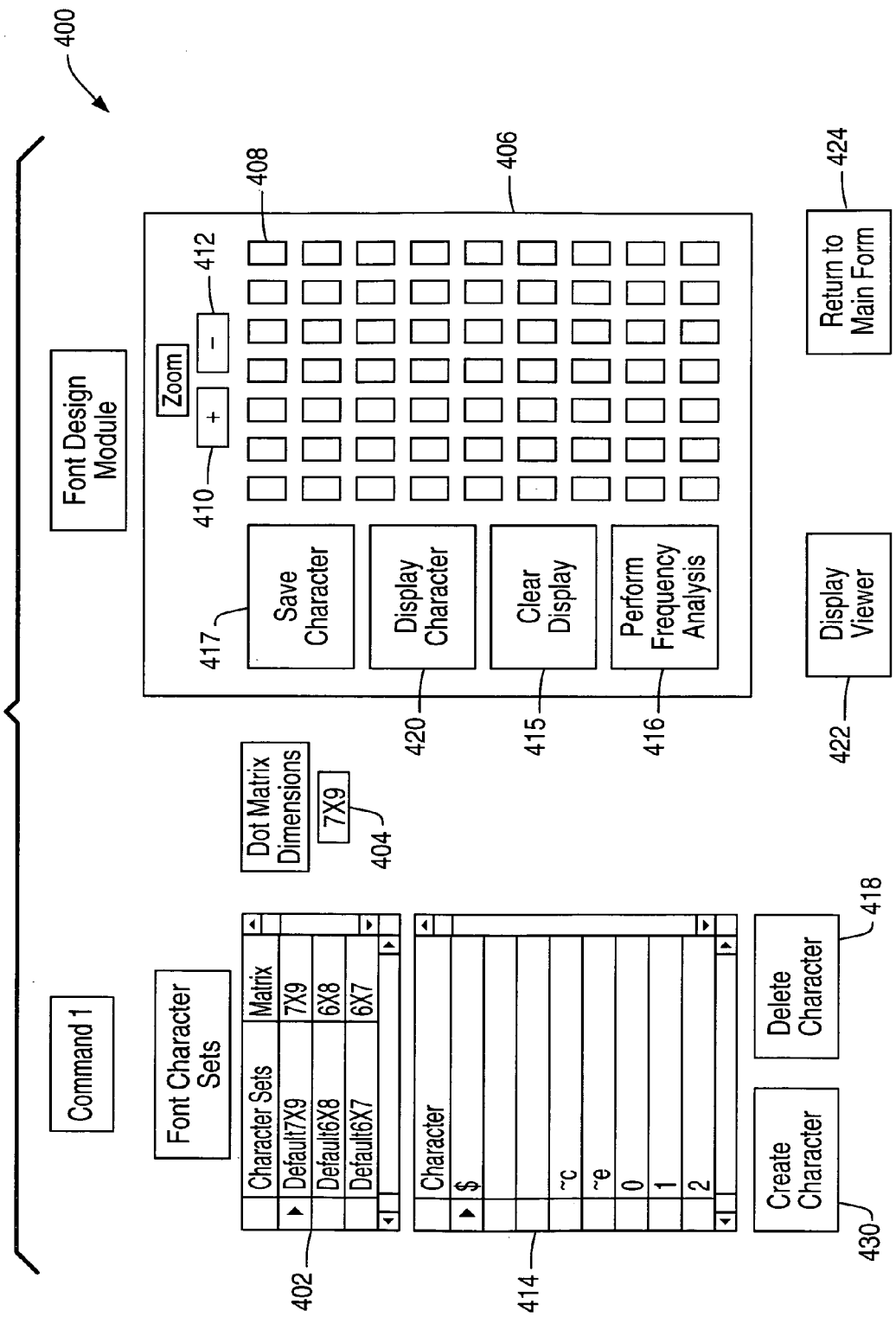
FIG. 4 illustrates a character set design module interface form according to the present invention.

FIG. 4 illustrates a character set design module user interface form 400 according to the present invention, used to provide a user interface with the character set design module 204. The user interface form 400 includes a character set list 402. The character set list 402 includes the names of all character sets previously saved after creation or during the process of development. In order to work on a previously created or initiated character set, the user selects the name of the set from the list, preferably by clicking on the name. If the user wishes to create a new character set, the user scrolls the list until an unoccupied space appears, clicks on the unoccupied space and types in a name.

Once the user has selected an already existing character set or typed in a name for a new character set, a default size appears in the size indicator 404. The size indicator 404 initially indicates a default matrix size, for example the size 7 by 9 illustrated here. In order to change the size of the character set, the user selects an alternative character set in the character set list 402 having the desired size, or alternatively scrolls to a blank entry area of the character set list 402. The character set list 402 includes a plurality of blank entry areas for entry of a new character set name. A blank entry area exists for each available matrix size, allowing the user to select a blank entry area having the desired matrix size and type in a desired name for the character set to be created.

Once the desired character set has been selected, either through selection of an existing character set or selection of a blank entry area and entry of a desired name therein, the matrix designer 406 shows a matrix of pixel positions 408, having dimensions reflecting the matrix size currently selected. For example, the matrix designer 406 is shown here as containing a matrix 408 having 7 columns and 9 rows, which is the matrix size shown by the size indicator 404. The user may increase or decrease the displayed size of the matrix 408 by pressing the "Zoom Up" button 410 or the "Zoom Down" button 412 in the matrix designer 410. This causes the matrix 408 to appear larger or smaller, but does not change the dimensions of the matrix 408.

In order to create a character, the user selects a character in the character list 414 or alternatively types a character into an empty slot in the list 414. If the user wishes to create a new character from scratch, the user presses the "Create Character" button 430. The character list 414 preferably includes a set of default characters, but can accommodate new characters typed in by the user. For example, if the user wishes to add lower case characters to a character set previously containing only upper case characters, the user types each character into an empty position in the character list 414, selects that character and proceeds to make design choices for that character.

After pressing the "Create Character" button 430, the user designs the selected character by selecting or deselecting pixel positions as desired in the pixel position matrix 408. If a pixel position is selected, the matrix design for a character will include a dot at that position, and if a pixel position is deselected, the matrix design for the character will not include a dot at that position. The user preferably selects desired pixel positions by moving a mouse pointer to a desired position and clicking on the position. Clicking on an unselected position suitably selects the position, and clicking on a selected position suitably deselects the position. The user may select and deselect pixel positions as desired until satisfied with the appearance of the matrix 408. The user may deselect all pixels at any time by pressing the "Clear Display" button 415, or may perform frequency analysis on the displayed character at any time by pressing the "Perform Frequency Analysis" button 416.

Frequency analysis determines the proportion of characters in a given character set having a particular pixel in the matrix 408. When the "Perform Frequency Analysis" button 416 is pressed, typically by moving a pointer over the button using a pointing device such as a mouse, and then clicking or otherwise activating the pointing device, a number between 0 and 1 appears in each pixel location in the matrix 408. This number indicates the proportion of characters in the character set which use the pixel location in which the number appears. Frequency analysis is useful because in some instances a pixel location may never be used and therefore need not be used in a display according to the design being developed, allowing the use of simpler hardware and a savings in cost. In other instances, a pixel location may be infrequently used, and it may be advantageous to modify a design in order to allow the pixel location to be left out of the design, resulting in hardware and cost savings.

When the user is satisfied with the appearance of the matrix 408, he or she may save the character by pressing the "Save Character" button 417. The user may then select another character and repeat the process of matrix design with that character and may continue to select and design characters until satisfied with the character set. If the user wishes to delete a character from the character set, he or she may select the character and press the "Delete Character" button 418.

If the user wishes to modify an already existing character design, he or she selects the character from the character list 414 and presses the "Display Character" button 420. The pixels making up the selected character are then displayed in the matrix 408. The user modifies the matrix 408 as desired, and presses the "Save Character" button 417.

To simplify the process of character set design, the character set design module 204 preferably provides a default character set having a default matrix for each character in the set. The user may select the default character set and then, when a character is selected for design, the user can press the "Display Character" button 420 and the default character will appear in the pixel positions in the matrix designer 406. The user can than make modifications of the already existing character, rather than selecting every pixel for the character. Main Form" button 424 to invoke the control module 202. The user interface 300 of FIG. 3 will appear, and the user may then make any desired selection.

Once the user has finished creating a character set, or if the user wishes to examine and work with characters already created, he or she may press the "Display Viewer" button 422 to invoke the display viewer described below. Alternatively, the user may press the "Return to pixel positions in the matrix designer 406. The user can then make modifications of the already existing character, rather than selecting every pixel position for the entire character.

Figure 5:
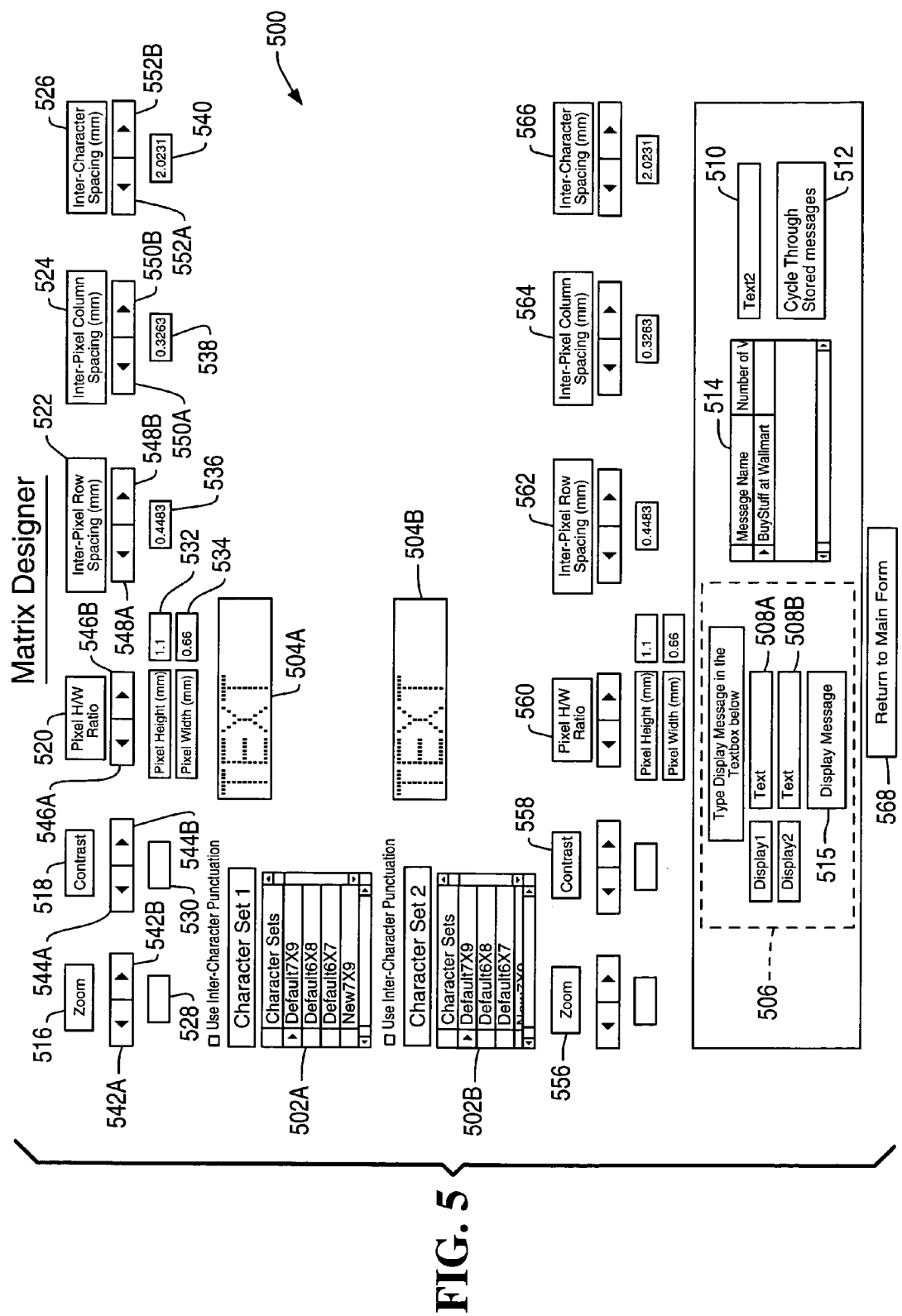
FIG. 5 illustrates a display design module interface form according to the present invention.

FIG. 5 illustrates a display design module interface form 500, providing a user interface to the design display module 206 of FIG. 2. The interface form 500 includes first and second character set selection lists 502A and 502B, with first and second character displays 504A and 504B adjacent to the first and second selection lists 502A and 502B, respectively. The user may select one of the listed character sets, which represent character sets previously created and stored using the font designer module 204. The user interface form 500 also includes a display input interface 506, including first and second display inputs 508A and 508B. The user types desired text into one or more of the display inputs 508A or 508B, for display on one or both of the first or second character displays 504A or 504B, respectively. A plurality of messages can be stored for each of the displays. In order to store messages, a user types a message in the stored message box 510 and presses the "Cycle Through Stored Messages" button 512. After the user presses the button 512, the message typed into the box 510 is stored and listed in the stored message list 514. When the user wishes to display a message, he or she presses the "Display Message" button 515, and a message is displayed on the displays 504A and 504B. using the selected character sets.

The interface form 500 includes a first set of editing tools for changing the appearance of the first display 504A. The first set of editing tools includes a first zoom level selector 516, a first contrast editor 518, a first pixel height to width ratio editor 520, a first inter-pixel row spacing editor 522, a first inter-pixel column spacing editor 524 and a first inter-character spacing editor 526. Desired values can be entered using the entry boxes 528–540 or adjusted using the adjustment arrows 542A–554A or 542B–554B. The zoom editor 516 adjusts the size of the display 504A. The contrast editor 518 adjusts the contrast between selected and deselected pixels, that is, photometric contrast between dark pixels representing selected pixel positions and light pixels representing deselected pixel positions.

The first display 504A immediately reflects changes made using the editing tools 516–526. The interface form 500 also includes a second set of editing tools for changing the appearance of the second display 504B. The second set of editing tools includes a second zoom level selector 556, a second contrast editor 558, a second pixel height to width ratio editor 560, a second inter-pixel row spacing editor 562, a second inter-pixel column spacing editor 564 and a second intercharacter spacing editor 566. The first character set selection list 502A, character display 504A and display input 508A, along with the first set of editing tools can be viewed as a first display emulator and the second character selection list 502B, character display 504B and display input 508B along with the second set of editing tools can be viewed as a second display emulator. By simultaneously viewing the first and second character displays 504A and 504B and making desired entries and choices affecting each display, the user can easily compare alternative designs or modifications of a display. When the user has finished using the form 500, he or she may click the "Return to Main Form" button 568 in order to invoke the control module 202.

Figure 6:
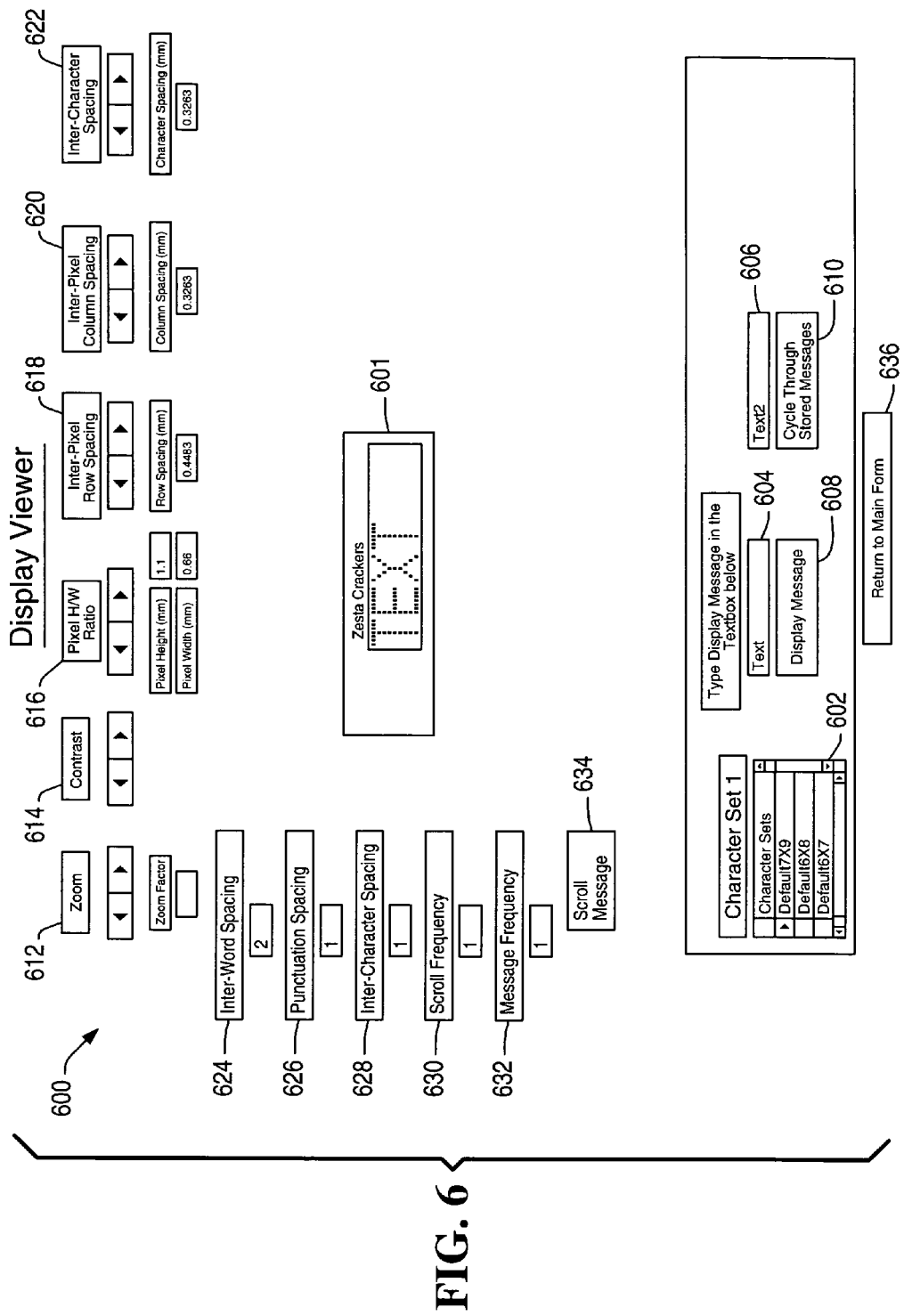
FIG. 6 illustrates a display viewer module interface form according to the present invention.

FIG. 6 illustrates a display viewer module interface form 600, which provides a user interface with the display viewer module 208 of FIG. 2. The display viewer interface form 600 provides a model of an actual working display and allows the user to select and modify various features of the display and to see the effect of the selections and modifications. The form 600 includes a display 601, which displays messages having characteristics and features determined by the user. The user selects the characteristics and features of the displayed messages as described below.

The form 600 includes a character set selection list 602, allowing the user to select from list of character sets previously created using the font designer module 204. The form 600 also includes a text entry box 604 allowing the user to enter text for display, and a stored message entry box 606 allowing the user to store additional messages which can be selected for display, typically by cycling between the display message and the various stored messages. The form 600 includes a "Display" button 608. When the user presses the "Display" button 608, the contents of the text box 604 are displayed using the display 601. The form 600 also includes a "Cycle Through Stored Messages" button 610. Pressing of the "Cycle Through Stored Messages" button 610 causes the display 601 to cycle between the message previously in the box 604 and the various messages previously entered in the box 606 and stored. The form 600 includes editing tools 612–622, similar to the editing tools 516–526 of FIG. 5. The form 600 also includes a set of tools for controlling the appearance of the display 601, including an inter-word spacing tool 624, a punctuation spacing tool 626, an inter-character spacing tool 628, a scroll frequency tool 630 and a message frequency tool 632. The inter-word spacing tool 624 allows the user to enter a value, in pixels, for the spacing between characters in a word. The punctuation tool 626 allows the user to enter a value, in pixels, for the spacing surrounding a punctuation mark in the display 601. The inter-character spacing tool 628 allows the user to enter a value, in pixels, for the spacing between characters. The scroll frequency tool 630 allows the user to enter a rate at which a message on the display 601 will scroll from right to left. The message frequency tool 632 allows the user to specify a frequency at which a message will be displayed. When the user presses the "Scroll Message" button 634, the display 601 toggles between a stationary message and a scrolling message. When the user presses the "Return to Main form" button 636, the control module interface form 300 is displayed.

Figure 7:
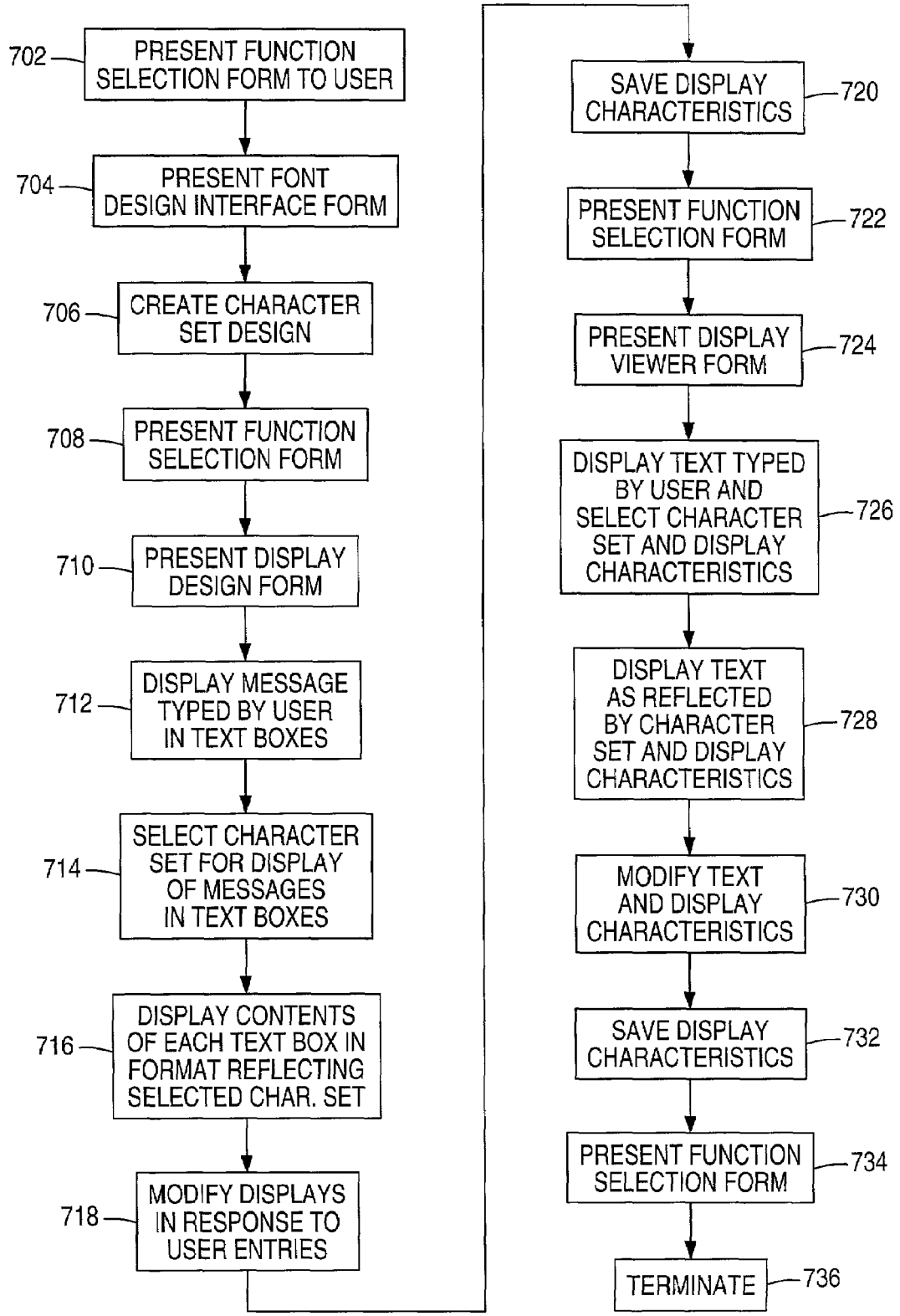
FIG. 7 illustrates a process of design generation according to the present invention.

FIG. 7 illustrates a process 700 for dot matrix display design according to the present invention. At step 702, a function selection form is presented to a user. At step 704, in response a user selection, for example clicking the button 302 of FIG. 3, a character set design interface form is presented to the user. The font design interface form may suitably be similar to the form 400 of FIG. 4. At step 706, in response to selections and choices made by the user, for example selecting and creating characters using the form 400 of FIG. 4 by selecting characters for creation from the character list 414 and selecting desired pixel locations in the matrix 412, a design is created for one or more character sets, each character set comprising of a plurality of characters. The user choices include a choice for the size of each character set and with the design being created by user choices of dot matrix size for each character set, and user choices of dot locations for each character. Each character is saved in response to a user selection such as clicking the "Save Character" button 417, and characters may be deleted after creation in response to a user selection such as clicking the "Delete Character" button 418. At step 708, in response to a user selection to return to the function selection form, for example clicking the "Return to Main Form" button 424, the function selection form is presented to the user to allow the user to make alternative selections.

At step 710, in response to a user selection to invoke a display designer, for example clicking the "Display Designer" button 304 of FIG. 3, a display design form is presented to the user. The display design form may suitably be similar to the form 500 of FIG. 5. At step 712, a text message typed by the user is displayed in one or more of first and second text boxes. At step 714, in response to a user input such as clicking on a desired character set in a character set selection list such as the lists 502A and 502B of FIG. 5, a character set is selected for display of the message in each text box. At step 716, the contents of each text box are displayed in a format reflecting the selected character set. At step 718, modifications are made to each of the first and second displays in response to user entries, for example using the editing tools 516–526 of FIG. 5. At step 720, the character sets and other display characteristics entered by the user are saved. At step 722, in response to a user selection to return to the function selection form, for example by clicking on the "Return to Main Form" button 568 of FIG. 5, the function selection form is presented to the user. At step 724, in response to a further user selection, such as clicking on the "Display Viewer" button 308 of FIG. 3, a display viewer form is presented to the user. The display viewer form may suitably be similar to the display viewer form 600 of FIG. 6. At step 726, text typed by the user is displayed in a text box and a character set and other design feature characteristics are selected for display of the text in response to a user entry. At step 728, the entered text is displayed in a format reflecting the selected character set. At step 730, in response to additional user entries, such as making desired entries and selections using the editing tools 612–622 of FIG. 6, the appearance of the text and other features of the display are modified. At step 732, the display features are saved. At step 734, in response to a further user selection, such a clicking on the "Return to Main Form" button 636 of FIG. 6, the function selection form is presented to the user. At step 736, in response to a final user selection, such as clicking on the "Exit" button 308 of FIG. 3, the process terminates. Although the various modules have been illustrated here as being invoked in sequence, it will be recognized that the modules may be invoked in any order desired by the user. For example, the user may repetitively alternate between the display designer and the design viewer in order to modify display characteristics using a previously created font, or may use the different modules in other ways suitable to his or her immediate needs.

While the present invention is disclosed in the context of a presently preferred embodiment, it will be recognized that a wide variety of implementations may be employed by persons of ordinary skill in the art consistent with the above discussion and the claims which follow below.

I claim:

1. A dot matrix display design tool, comprising:
   a font designer for creating a character set comprising a plurality of characters and a character design associated with each of the characters, the character design comprising a pattern of selected and deselected pixel positions in a matrix of pixel positions, the font designer creating each character design in response to selections made by a user, the font designer further allowing the user to save and delete characters as desired; and
   a display designer comprising a text input entry interface for text input by a user and a character set selection interface to allow user selection of a selected character set for displaying the text, the display designer further comprising an operating characteristics interface for receiving operating characteristics entries specifying operating characteristics of an operating display to be emulated, the display designer further including a display emulator presenting a representation of the operating display, the representation of the operating display presenting the text input in a format reflecting the selected character set and exhibiting the operating characteristics specified by the operating characteristics entries, the display designer further including a set of editing tools to allow modification of the display in response to selections made by a user, the editing tools supporting modification of the character set and the operating characteristics of the display, modifications made using the editing tools being reflected in the appearance of the text as presented by the display emulator.

2. The design tool of claim 1 further comprising a display viewer for emulating a dot matrix display, the display viewer being operative to receive input text and a character set selection, the display viewer being further operative to display the input text in a format reflecting the character set selection, the display viewer being further operative to simulate additional characteristics of a dot matrix display in displaying the input text, the display viewer being further operative to modify the additional characteristics in response to user selections.

3. The design tool of claim 2 wherein the display emulator is a first display emulator and the display designer further comprises a second display emulator, the first and second display emulators allowing the user to simultaneously view first and second text entries and to view results of independent selections and modifications relating to the first and second text entries.

4. The design tool of claim 3 wherein the font designer comprises a dot matrix designer comprising an array of pixel positions to be selected or deselected by the user, the font designer allowing user selection of each of a plurality of characters and allowing the user to select use the dot matrix designer to select or deselect pixel positions to create an array of pixels to be associated with the selected character.

5. The design tool of claim 4 wherein the font designer allows user specification of a character size to be associated with a character set and wherein the font designer sets dimensions of the array of pixel positions according to the character size specified by the user.

6. The design tool of claim 5 wherein the editing tools allow specification of contrast, pixel height and width, spacing between rows of pixels making up a character and spacing between columns of pixels making up a character.

7. The design tool of claim 6 wherein the display viewer allows storage of a set of messages and cycling between the messages at a rate selected by the user.

8. The design tool of claim 7 wherein the display viewer allows scrolling of a displayed message at a rate selected by the user.

9. The design tool of claim 8 wherein the display viewer includes a set of editing tools to allow modification of display characteristics, the editing tools allowing specification of interword spacing, intercharacter spacing and spacing surrounding punctuation characters.

10. A method of display design for a dot matrix display device comprising the steps of:
   creating a character set design in response to selection by a user of each of a set of characters from a character list and specification of pixel values for the character in a matrix designer providing a visual model of an array of available pixel locations for the character;
   displaying a message using the selected character set design, the display of the message presenting text specified by the user and being presented as the message would appear in an operating display using the selected character set design and exhibiting operating characteristics chosen in response to user specifications; and
   modifying aspects of the design in response to user selections, the appearance of the display of the message being immediately altered to reflect each user selection.

11. The method of claim 10 wherein the step of displaying a message includes displaying a first message simultaneously with a second message and independently modifying characteristics of each displayed message to allow comparison between the two displayed messages.

12. The method of claim 11 and further including displaying a representation of a hardware display unit using the character set design and modifying selected features of the representation in response to user selections, the modifications including modifications to features of the character set design and the operating characteristics of the hardware display unit being represented, each modification being immediately displayed upon entry of a corresponding user selection.

* * * * *